(12) United States Patent
Mueller et al.

(10) Patent No.: US 10,500,983 B2
(45) Date of Patent: Dec. 10, 2019

(54) LOCKING UNIT FOR A VEHICLE SEAT, AND VEHICLE SEAT

(71) Applicant: Johnson Controls Components GmbH & Co. KG, Kaiserslautern (DE)

(72) Inventors: Peter Mueller, Mackenbach (DE); Andreas Vedder, Haan (DE); Volker Windecker, Sippersfeld (DE); Richard Haensel, Flonheim (DE); Stefan Haber, Pirmasens (DE); Silke Labuk, Weilerbach (DE); Oezkan Demirci, Bochum (DE); Igor Gordeenko, Frechen (DE); Patrick Handl, Cologne (DE); Uwe Moeller, Solingen (DE); Christina Jungblut, Ramstein (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 14/917,767

(22) PCT Filed: Sep. 8, 2014

(86) PCT No.: PCT/EP2014/069075
§ 371 (c)(1),
(2) Date: Mar. 9, 2016

(87) PCT Pub. No.: WO2015/036360
PCT Pub. Date: Mar. 19, 2015

(65) Prior Publication Data
US 2016/0214506 A1   Jul. 28, 2016

(30) Foreign Application Priority Data

Sep. 10, 2013 (DE) .......................... 10 2013 218 076
Jan. 3, 2014 (DE) .......................... 10 2014 200 012

(51) Int. Cl.
*B60N 2/015* (2006.01)
*B60N 2/36* (2006.01)
(Continued)

(52) U.S. Cl.
CPC ......... *B60N 2/01583* (2013.01); *B60N 2/366* (2013.01); *E05B 77/38* (2013.01);
(Continued)

(58) Field of Classification Search
CPC ................ B60N 2/01583; B60N 2/366; B60N 2205/20; E05B 77/38; E05B 85/26;
(Continued)

(56) References Cited

U.S. PATENT DOCUMENTS 4,971,379 A * 11/1990 Rumpel ............. B60N 2/01583
248/503.1
6,012,747 A * 1/2000 Takamura ............... B60N 2/366
292/210
(Continued)

FOREIGN PATENT DOCUMENTS

DE         103 27 448 A1    1/2005
DE    10 2006 003 022 A1    7/2007
(Continued)

*Primary Examiner* — Kristina R Fulton
*Assistant Examiner* — Faria F Ahmad
(74) *Attorney, Agent, or Firm* — McGlew and Tuttle, P.C.

(57) ABSTRACT

A locking unit (10) for a vehicle seat (1) includes a pawl (80) which is mounted pivotably about a pivot axis between an open position and a closed position and has a retaining contour (27) for securing a locking pin (12) in the closed position. At least one claw (90, 91, 92) is mounted pivotably about the same pivot axis in a manner offset in the axial direction with respect to the pawl (80). The claw (90, 91, 92) has a closing contour (25). The pawl (80) is pivotable from the open position into the closed position by the closing contour (25) being acted upon by the locking pin (12).

18 Claims, 10 Drawing Sheets

(51) Int. Cl.
*E05B 77/38* (2014.01)
*E05B 85/26* (2014.01)

(52) U.S. Cl.
CPC .......... *E05B 85/26* (2013.01); *B60N 2205/20* (2013.01); *Y10T 292/0911* (2015.04); *Y10T 292/108* (2015.04); *Y10T 292/1021* (2015.04); *Y10T 292/1047* (2015.04); *Y10T 292/1082* (2015.04); *Y10T 292/1092* (2015.04)

(58) Field of Classification Search
CPC ......... Y10T 292/0911; Y10T 292/1021; Y10T 292/1047; Y10T 292/108; Y10T 292/1082; Y10T 292/1092
USPC ................ 292/95, 216, DIG. 23; 297/378.13
See application file for complete search history.

(56) References Cited

U.S. PATENT DOCUMENTS

| | | | | |
|---|---|---|---|---|
| 6,733,078 | B1* | 5/2004 | Zelmanov | B60N 2/2245 292/201 |
| 7,044,552 | B2* | 5/2006 | Muller | B60N 2/01583 296/65.03 |
| 7,762,605 | B2* | 7/2010 | Otsuka | B60N 2/01583 296/65.03 |
| 8,511,723 | B2* | 8/2013 | Otsuka | B60N 2/01583 292/216 |
| 8,544,931 | B2* | 10/2013 | Park | B60N 2/01583 296/65.03 |
| 8,590,973 | B2* | 11/2013 | Matsuura | B60N 2/366 292/216 |
| 8,708,413 | B2* | 4/2014 | Heeg | B60N 2/01583 297/378.13 |
| 8,727,443 | B2* | 5/2014 | Vedder | B60N 2/366 297/335 |
| 8,894,153 | B2* | 11/2014 | Ohba | B60N 2/2352 297/378.13 |
| 9,039,089 | B2* | 5/2015 | Ohba | B60N 2/2352 297/378.13 |
| 9,156,383 | B2* | 10/2015 | Handl | B60N 2/366 |
| 2009/0224586 | A1 | 9/2009 | Otsuka et al. | |
| 2010/0032967 | A1* | 2/2010 | Otsuka | B60N 2/01583 292/240 |
| 2010/0052394 | A1* | 3/2010 | Heeg | B60N 2/366 297/378.13 |
| 2010/0102614 | A1* | 4/2010 | Kreuels | B60N 2/01583 297/378.13 |
| 2011/0304160 | A1* | 12/2011 | Kamata | B60N 2/366 292/197 |
| 2012/0013166 | A1* | 1/2012 | Park | B60N 2/01583 297/463.1 |
| 2012/0193966 | A1 | 8/2012 | Matsuura et al. | |
| 2013/0328372 | A1* | 12/2013 | Suzumura | B60N 2/366 297/378.13 |
| 2017/0122012 | A1* | 5/2017 | Nam | E05B 15/0086 |

FOREIGN PATENT DOCUMENTS

| | | |
|---|---|---|
| DE | 10 2007 016 409 A1 | 10/2008 |
| DE | 10 2008 048 711 A1 | 3/2010 |
| DE | 10 2009 021 297 A1 | 11/2010 |
| DE | 10 2009 037 037 A1 | 2/2011 |
| DE | 20 2011 100 040 U1 | 8/2011 |
| FR | 2 828 149 A1 | 2/2003 |
| JP | 2010 285127 A | 12/2010 |
| WO | 2010/054860 A2 | 5/2010 |

* cited by examiner

LOCKING UNIT FOR A VEHICLE SEAT, AND VEHICLE SEAT

CROSS REFERENCE TO RELATED APPLICATIONS

This application is a United States National Phase Application of International Application PCT/EP2014/069075 filed Sep. 8, 2014, and claims the benefit of priority under 35 U.S.C. § 119 of German Patent Applications 10 2013 218 076.4 filed Sep. 10, 2013 and 10 2014 200 012.2 filed Jan. 3, 2014, the entire contents of which are incorporated herein by reference.

FIELD OF THE INVENTION

The invention relates to a locking unit for a vehicle seat having a locking detent which is pivotably supported about a pivot axis between an open position and a closed position and which has a retention contour in order to retain a locking bolt in the closed position. The invention also relates to a vehicle seat having at least one such locking unit.

BACKGROUND OF THE INVENTION

WO2010/054860 A2 discloses a locking unit of the generic type for a vehicle seat. Such a locking unit comprises a rotary latch which is pivotably supported about a pivot axis for locking with a locking bolt. A catch detent which is pivotably supported about another pivot axis secures the rotary latch in the locked state of the locking unit. A pivotably supported clamping element which is referred to as a tolerance compensation detent applies to the rotary latch a closing moment and thereby eliminates any play which is present between the rotary latch and the locking bolt.

DE 20 2011 100 040 U1 also discloses a locking unit of the generic type for a vehicle seat. The locking unit has two bearing pins which serve to pivotably support the rotary latch and the catch detent and the clamping element. The two bearing pins also serve to secure the locking unit to the structural component of the vehicle seat and are constructed to be approximately hollow-cylindrical. In order to secure the locking unit to the structural component of the vehicle seat, there are further provided two screws which each engage through one of the two bearing pins and which are screwed into the structural component or an additional nut.

In the mentioned known locking units, the rotary latch has four contours which fulfill different functions. A retention contour is used to retain the locking bolt in the locked state. A support contour cooperates with the clamping element in order to discharge play and with the catch detent in order to secure the rotary latch in the locked state. A contour for retaining in the open state cooperates with the catch detent in order to secure the catch detent in the unlocked state. A closure contour is used during unlocking of the locking unit in order to eject the locking bolt. When the locking unit is locked, the locking bolt moves into abutment with the closure contour and thereby pivots the rotary latch into the closed position thereof and the locking unit moves into the locked state.

In the locked state of the locking unit, the rotary latch is in the closed position and the retention contour retains the locking bolt. In the unlocked state of the locking unit, the rotary latch is in the open position.

Such locking units are used, for example, to lock a backrest of a vehicle seat to a seat member and/or to a bodywork or structure of a vehicle or to lock the vehicle seat to the bodywork or structure of the vehicle.

It is also possible to lock engine hoods, rear flaps or doors of vehicles with such locking units to the bodywork or structure of the vehicle.

For example, DE 10 2006 003 022 A1, DE 10 2009 021 297 A1, DE 103 27 448 A1 and DE 10 2009 037 037 A1 disclose such locking units which are also referred to as locks.

SUMMARY OF THE INVENTION

An object of the invention is to improve a locking unit of the type mentioned in the introduction, in particular to reduce the necessary structural space.

A locking unit of the generic type for a vehicle seat comprises a locking detent which is pivotably supported about a pivot axis between an open position and a closed position and which has a retention contour in order to retain a locking bolt in the closed position.

In the locked state of the locking unit, the locking detent is in the closed position and the retention contour retains the locking bolt. In the unlocked state of the locking unit, the rotary latch is in the open position.

According to the invention at least one claw is pivotably supported about the same pivot axis so as to be offset in the axial direction relative to the locking detent, wherein the claw has a closure contour, wherein the locking detent can be pivoted from the open position into the closed position by the closure contour being acted upon by the locking bolt.

As a result of the provision of a locking detent and at least one claw, which are arranged to be axially offset relative to each other, in place of a rotary latch, the known integration of the retention contour, closure contour, support contour and contour for retaining in the open state is advantageously divided over a rotary latch.

The integration division allows a smaller structural space because an optimum spatial nesting of the components can be achieved as a result of the described multi-component configuration. The multi-component configuration allows the division of regions which take up high loads and regions which are subjected to lower loads over separate components. More regions can thereby be constructed from light materials and the overall weight is reduced.

A locking detent having a retention contour is therefore connected to at least one claw so that the locking detent can be moved from an open position into a closed position by a closure contour located on the claw being acted on accordingly.

It is thereby possible to configure the shape of a locking detent having a retention contour in such a manner that its contact location with respect to a locking bolt is in approximately the same plane perpendicular to the pivot axis thereof or the instantaneous center of rotation thereof as a contact location of the locking bolt with respect to a stop element.

Therefore, the locking unit preferably comprises a stop element which is arranged in such a manner that, when the locking unit is locked, the locking bolt abuts the stop element in a first contact location and the retention contour in a second contact location, wherein the first contact location and the second contact location are located at least approximately in a plane which extends perpendicularly to the axial direction.

The locking detent having a retention contour does not thereby have to move, or has to move less, about the pivot axis thereof in order to compensate for angular deviations of the locking bolt relative to the pivot axis thereof.

A clamping element which drives the claw can then be constructed so as to have a mean contact angle which is smaller over the contact region with respect to the claw for the same pivot range.

For the same drive moment of the clamping element, the clamping element therefore begins to move only in the event of higher forces which act on the locking detent in an opening manner.

The simultaneous contact of the locking bolt with the stop element and the retention contour of the locking detent is thus also retained in the event of higher dynamic excitations of the locking bolt and noises as a result of changing contact conditions between the locking detent, the locking bolt and the stop element are avoided.

The arrangement of the closure contour on a claw which is arranged to be offset relative to the locking detent allows the locking detent to be formed in such a manner that the locking detent can move from the closed position into the open position without colliding with the stop element which is arranged in the same functional plane.

The stop element is preferably arranged to be offset relative to the claw in an axial direction. The claw thereby pivots past the stop element during locking and unlocking of the locking unit.

According to an advantageous embodiment of the invention, the claw has a support contour which cooperates in the closed position of the locking detent with a catch detent in order to secure the locking detent and/or with a clamping element in order to discharge play of the locking detent.

Therefore, the locking detent is connected to at least one claw which is arranged in an axially offset manner with respect to the contact region of the locking bolt with the locking detent. There is located on at least one claw which is arranged in this manner and which is connected to the locking detent the support contour which also ensures load absorption at the contact region of the locking detent with respect to the locking bolt at forces which can bring about a movement of the clamping element.

The clamping element is preferably pivotably supported about a second pivot axis which extends parallel with the pivot axis of the locking detent. However, for example, it is also conceivable for the clamping element to be constructed as a wedge which is guided in translation movement.

According to another advantageous embodiment of the invention, the claw has a contour for retaining in the open state which cooperates with a catch detent in order to secure the catch detent in the open position of the locking detent.

A contour for retaining in the open state which is arranged on an additional component or on the claw therefore retains the claw and a catch detent which abuts it in the open position.

Alternatively, the contour for retaining in the open state may also be located on a stop element which is movably connected to the housing in the functional plane of the first detent.

The locking detent and the claw are preferably connected to each other in a rotationally secure manner in both pivoting directions. The connection of the components locking detent and claw, which are arranged in offset functional planes, can be brought about in a positive-locking, non-positive-locking or materially engaging manner. The connection may also partially act only in one movement direction.

According to an advantageous development of the invention, the locking device comprises two connection plates which extend parallel with each other and which have two retention holes in which a bearing pin is inserted, respectively, and a retention opening, in which a retention bolt having a gripping opening is inserted, wherein the retention opening and/or the gripping opening is/are constructed as a slot. It is thereby possible to adapt the locking unit to different gauges of the vehicle seat.

According to an advantageous development of the invention, the locking detent and the claw are partially surrounded by a common covering which preferably comprises a plastics material. As a result, in an advantageous manner, a reduction of the occurrences of noises can be brought about during closure or opening of the detent as a result of the contact with the bolt.

According to an advantageous development of the invention, the claw has a support contour, a closure contour, a contour for retaining in the open state and a projection having a retention contour.

The covering preferably covers at least the retention contours of the projections of the locking detent and the claw.

The covering preferably has a convex curvature in the region of the retention contours so that, in the locked state of the locking unit, the contact locations of the locking bolt with respect to the covering of the retention contours and with respect to the stop element are approximately in a plane which extends perpendicularly to the axial direction.

The object is also achieved by a vehicle seat which has a locking unit according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
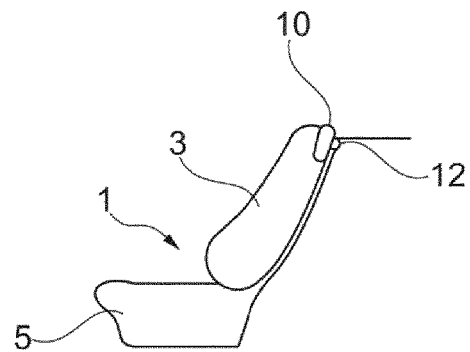
FIG. 1 is a schematic side view of a vehicle seat.
Figure 2:
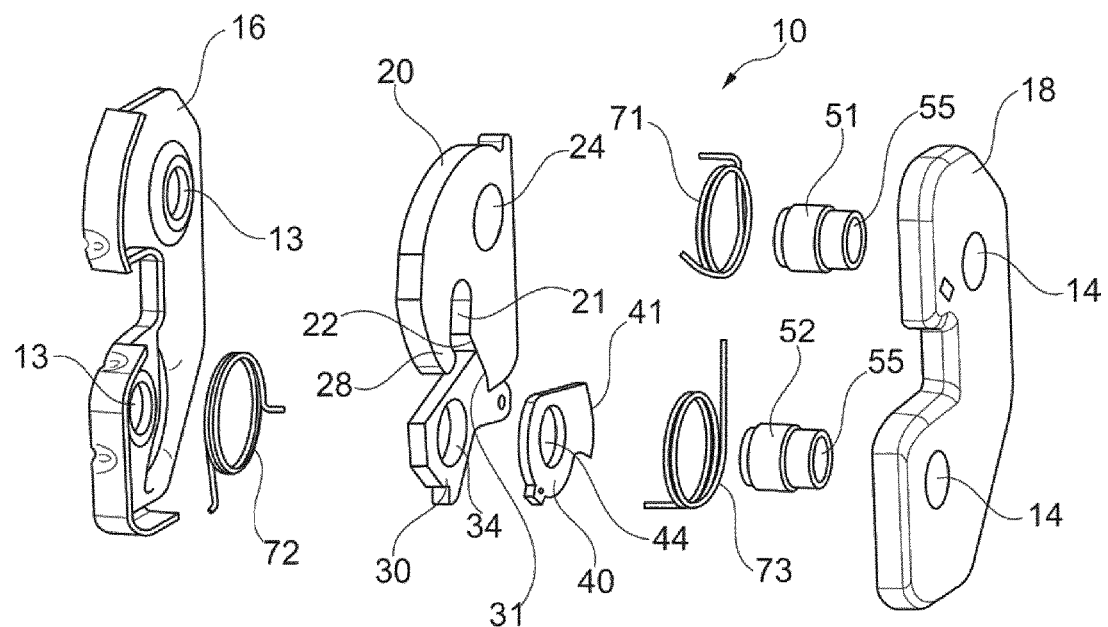
FIG. 2 is an exploded view of a locking unit of the generic type in accordance with the prior art.
Figure 3:
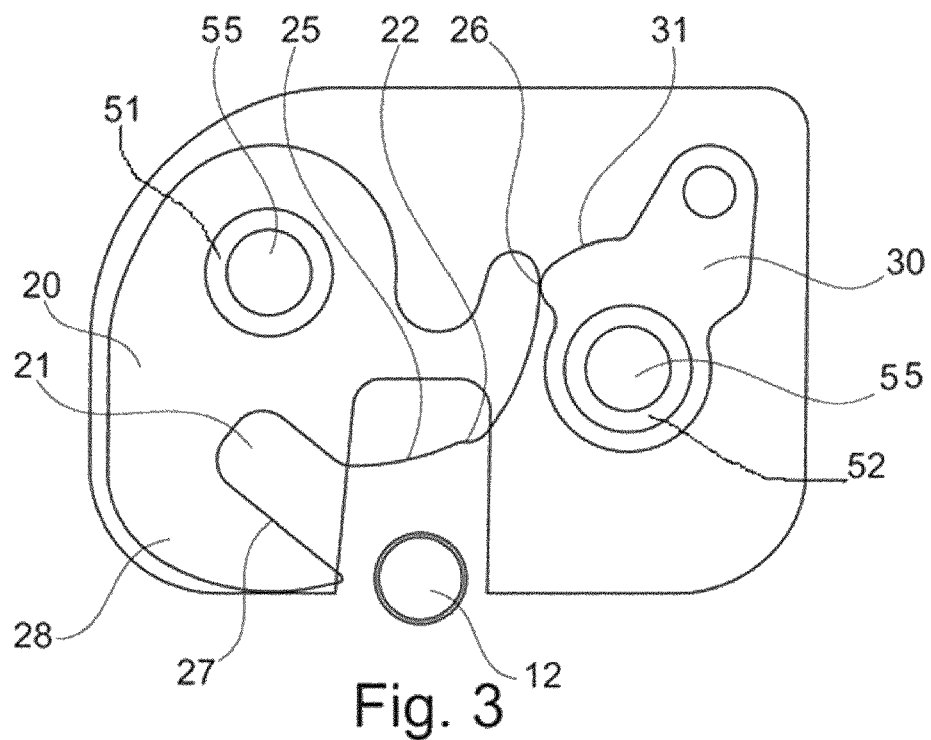
FIG. 3 is a schematic side view of an additional locking unit of the generic type in accordance with the prior art in the unlocked state.
Figure 4:
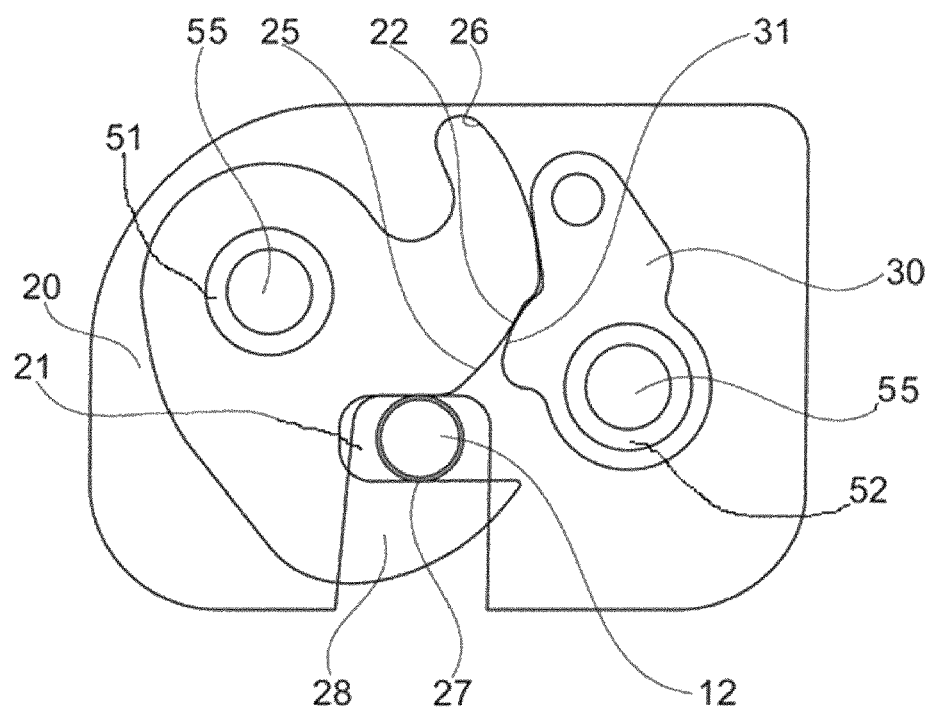
FIG. 4 is a schematic side view of the locking unit according to FIG. 3 in the locked state.

In a motor vehicle, there is provided a locking unit 10 for connection of a backrest 3 of a vehicle seat 1, in particular of a rear seat, to a vehicle structure. In this instance, the backrest 3 is fitted to a seat member 5 so as to be able to pivot from a position for use into a non-use position.

However, the locking unit 10 can also be used at other locations, for example, in order to fix the seat member 5 of the vehicle seat 1 to the floor structure of the motor vehicle or in a door lock.

The arrangement of the vehicle seat 1 inside the vehicle and the usual travel direction thereof define the directional indications used below. In this instance, a direction oriented perpendicularly to the ground is referred to below as the vertical direction and a direction perpendicular to the vertical direction and perpendicular to the travel direction is referred to below as the transverse direction.

A locking unit 10 according to the prior art has a lock housing which comprises a side plate 16 and a covering plate 18. The base faces of the side plate 16 and the covering plate 18 are constructed to be flat and are arranged in a plane defined by the travel direction and the vertical direction, that is to say, perpendicularly to the transverse direction. The side plate 16 comprises two first bearing holes 13 which are constructed to be circular. The covering plate 18 comprises two second bearing holes 14 which are constructed to be circular.

There is formed in the side plate 16 and in the covering plate 18 a receiving opening which opens in the direction of a locking bolt 12 in order to receive it for locking. In this instance, the locking unit 10 is fixed to the backrest 3 and the locking bolt 12 is fixed to the vehicle structure here. It is also conceivable for the locking unit 10 to be fixed to the vehicle structure and the locking bolt 12 to be fixed to the backrest 3. The portion of the locking bolt 12 to be received by the receiving opening extends in this case horizontally in a transverse direction.

A rotary latch 20 is pivotably supported on a first bearing pin 51 which is fixed to the side plate 16 and the covering plate 18. To this end, the rotary latch 20 has a rotary latch hole 24 through which the first bearing pin 51 extends. The rotary latch 20 further has a hook-like opening 21 for cooperation with the locking bolt 12. The rotary latch 20 is pretensioned in the opening direction by means of a first spring 71.

The rotary latch 20 has a support contour 22 which partially laterally delimits the hook-like opening 21. The support contour 22 is constructed to be substantially planar but can also be constructed, for example, to be curved in the manner of a circular arc and concave. In the locked state of the locking unit 10, the support contour 22 extends approximately in the direction of a second bearing pin 52 which extends parallel with the first bearing pin 51.

At the side of the hook-like opening 21 facing away from the rotary latch hole 24, opposite the support contour 22, the hook-like opening 21 is laterally delimited by a projection 28 of the rotary latch 20. The projection 28 has a retention contour 27 which abuts the locking bolt 12 in the locked state of the locking unit 10.

The first bearing pin 51 is inserted in a first bearing hole 13 of the side plate 16 and in a second bearing hole 14 of the covering plate 18 and projects perpendicularly from the base faces of the side plate 16 and the covering plate 18. The first bearing pin 51 consequently extends in this case in a transverse direction. The first bearing pin 51 has a through-opening 55 with a substantially constant inner diameter.

The second bearing pin 52 is also inserted in a first bearing hole 13 of the side plate 16 and in a second bearing hole 14 of the covering plate 18 and projects perpendicularly from the base faces of the side plate 16 and the covering plate 18. The second bearing pin 52 consequently also extends in a transverse direction in this case. The second bearing pin 52 has, similarly to the first bearing pin 51, a through-opening 55 with a substantially constant inner diameter.

The through-openings 55 of the bearing pins 51, 52 are used to receive a fixing means, for example, a screw, by means of which the locking unit 10 is fixed during assembly to the backrest 3 or another structural component of the vehicle seat 1 or the vehicle. To this end, the screws are screwed into fixing holes in the structural component.

A clamping element 40 is pivotably supported on the second bearing pin 52. To this end, the clamping element 40 has a clamping element hole 44 which is circular in this case and through which the second bearing pin 52 extends. The clamping element 40 is pretensioned in the direction toward the rotary latch 20 by means of a third spring 73.

In the locked state of the locking unit 10, if the hook-like opening 21 of the rotary latch 20 receives the locking bolt 12, the clamping element 40 applies a closing moment to the rotary latch 20 as a result of the pretensioning by the third spring 73 as a securing element. To that end, the clamping element 40 has a clamping face 41 which is eccentrically curved relative to the second bearing pin 52 and which is in non-self-locking contact with the support contour 22 of the rotary latch 20. In this case, the clamping face 41 is constructed to be curved in the manner of a circular arc and convex.

A catch detent 30 is arranged on the second bearing pin 52 axially beside the clamping element 40 and is also pivotably supported on the second bearing pin 52, that is to say, so as to be aligned with the clamping element 40. To this end, the catch detent 30 has a catch detent hole 34 which is circular in this instance and through which the second bearing pin 52 extends. The catch detent 30 is pretensioned in the direction toward the rotary latch 20 by means of a second spring 72.

The catch detent 30 has an engaging face 31 which is located adjacent to the clamping face 41 of the clamping element 40. In the locked state of the locking unit 10, the engaging face 31 is positioned with spacing from the support contour 22 of the rotary latch 20. In this case, the engaging face 31 is constructed to be curved in the manner of a circular arc and convex, but may also be planar.

In this instance, the catch detent 30 is arranged so as to be adjacent to the side plate 16 and the clamping element 40 is in this case arranged so as to be adjacent to the covering plate 18. The catch detent 30 and the clamping element 40 are connected for entrainment with free travel, for example, by means of a tongue and groove guide or by means of an axially protruding carrier.

The direction in which the bearing pins 51, 52 extend is referred to below as the axial direction. In this instance, in the case of the described fitting situation of the locking unit 10 on the backrest 3 of the vehicle seat 1, the axial direction extends parallel with the transverse direction.

In the locked state of the locking unit 10, the locking bolt 12 is located in the receiving opening which is formed in the side plate 16 and the covering plate 18 and in the hook-like opening 21 of the closed rotary latch 20. The retention contour 27 of the projection 28 adjoins the locking bolt 12. The clamping element 40 secures the rotary latch 20 by cooperation of the clamping face 41 with the support contour 22. The engaging face 31 of the catch detent 30 is slightly spaced apart from the support contour 22 of the rotary latch 20.

In order to open the locking unit 10, the catch detent 30 is pivoted away from the rotary latch 20, whereby the engaging face 31 of the catch detent 30 moves further away from the support contour 22 of the rotary latch 20. The catch detent 30 also carries the clamping element 40 as a result of the entrainment connection so that the rotary latch 20 is no longer secured.

As a result of the pretensioning as a result of the first spring 71, the rotary latch 20 opens and therefore pivots in an opening direction. Alternatively or additionally to the pretensioning by the first spring 71, the rotary latch 20 can also be carried by the catch detent 30 or by the clamping element 40 for opening.

As a result of the pivot movement of the rotary latch 20, the hook-like opening 21 withdraws from the receiving opening which is formed by the side plate 16 and the covering plate 18 and releases the locking bolt 12. In this instance, the locking bolt 12 slides along a closure contour 25 which is provided on the rotary latch 20 and moves away from the locking unit 10 counter to the inward pivoting direction.

If the locking bolt 12 has left the hook-like opening 21, the locking unit 10 is in the unlocked state. A contour 26 for retaining in the open state which is provided on the rotary latch 20 blocks the catch detent 30 in the position thereof in this case.

If, in this unlocked state of the locking unit 10, the locking bolt 12 again moves into the receiving opening which is formed by the side plate 16 and the covering plate 18 and into abutment with the closure contour 25 at the edge of the hook-like opening 21, the locking bolt 12 presses the rotary latch 20 into the closed position thereof. The clamping element 40 moves as a result of the pretensioning thereof by the third spring 73 along the support contour 22. In a state carried by the clamping element 40 or as a result of the pretensioning by the second spring 72, the catch detent 30 which is no longer blocked by the contour 26 for retaining in the open state pivots in the direction toward the rotary latch 20, wherein the engaging face 31 approaches the support contour 22 of the rotary latch 20. Afterwards, the locking unit 10 is again in the locked state.

The rotary latch 20 of the locking unit 10 according to the prior art consequently has a support contour 22, a closure contour 25, a contour 26 for retaining in the open state and a retention contour 27.

Figure 5:
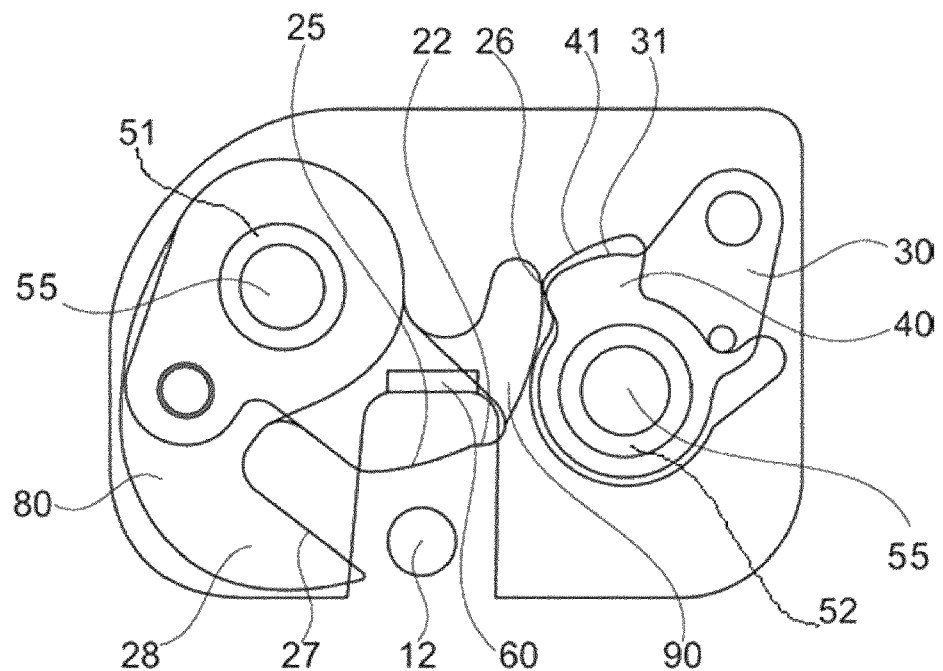
FIG. 5 is a schematic side view of a first embodiment of a locking unit according to the invention in the unlocked state.

FIG. 5 schematically illustrates a first embodiment of a locking unit 10 according to the invention in the unlocked state. The differences between the first embodiment and the locking unit known from the prior art will substantially be discussed below.

Instead of a rotary latch, the locking unit 10 according to the first embodiment has a locking detent 80 and a claw 90 which are pivotably supported on the first bearing pin 51 so as to be offset parallel in an axial direction. The locking detent 80 and the claw 90 are connected in a rotationally secure manner to each other in this case. The claw 90 is opposite the catch detent 30 and the clamping element 40 in this case.

The locking detent 80 and the claw 90 are therefore arranged in separate functional planes. A functional plane extends in this case perpendicularly to the axial direction and has, unlike a mathematical plane, an extent in an axial direction. The catch detent 30 and the clamping element 40 are located in the functional plane of the claw 90.

The locking detent 80 has a projection 28 having a retention contour 27. In the locked state of the locking unit 10, the retention contour 27 abuts the locking bolt 12.

The claw 90 has a support contour 22, a closure contour 25 and a contour 26 for retaining in the open state. In the locked state of the locking unit 10, the support contour 22 abuts the clamping face 41 of the clamping element 40 and the engaging face 31 of the catch detent 30 is spaced slightly apart from the support contour 22 of the claw 90.

In the unlocked state of the locking unit 10, the contour 26 for retaining in the open state of the claw 90 abuts the catch detent 30. During the locking and unlocking of the locking unit 10, the closure contour 25 of the claw 90 is in contact with the locking bolt 12.

In this instance, there is fitted to the covering plate 18 a stop element 60, which the locking bolt 12 abuts in the locked state of the locking unit 10. In the locked state of the locking unit 10, therefore, the locking bolt 12 is clamped between the retention contour 27 of the locking detent 80 and the stop element 60.

The stop element 60 is arranged in this instance in the functional plane of the locking detent 80. In the locked state of the locking unit 10, the contact locations of the locking bolt 12 are located with the retention contour 27 of the locking detent 80 and with the stop element 60 substantially in a plane which extends perpendicularly to the axial direction.

During the locking and unlocking of the locking unit 10, the claw 90 pivots past the stop element 60.

Figure 6:
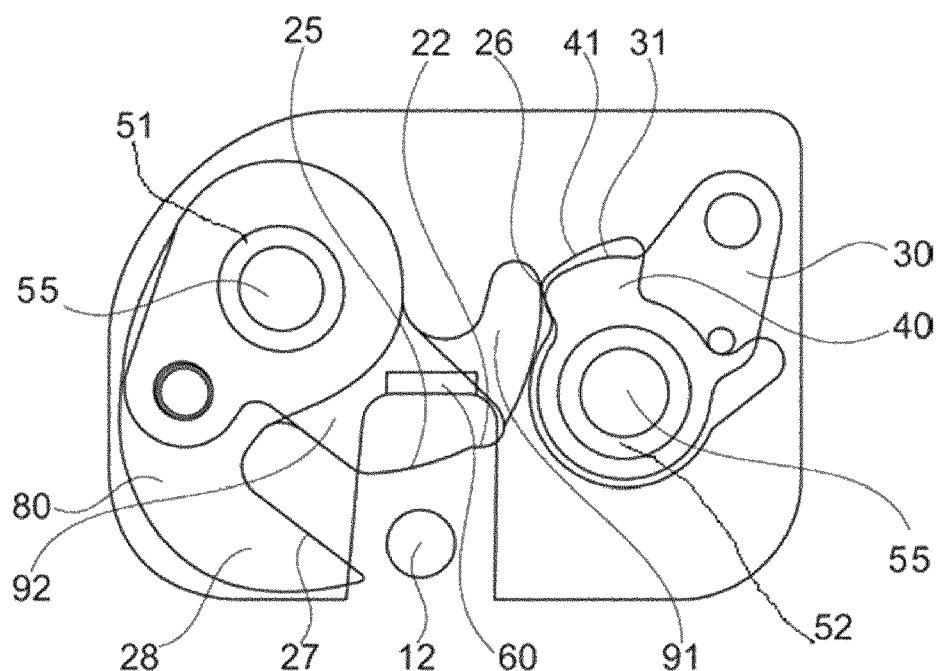
FIG. 6 is a schematic side view of a second embodiment of a locking unit according to the invention in the unlocked state.

FIG. 6 schematically illustrates a second embodiment of a locking unit 10 according to the invention in the unlocked state. The differences between the second embodiment and the locking unit known from the prior art will substantially be discussed below.

Instead of a rotary latch, the locking unit 10 according to the second embodiment has a locking detent 80, a clamping claw 92 and an engaging claw 91 which are pivotably supported on the first bearing pin 51 so as to be offset parallel in an axial direction. The locking detent 80, clamping claw 92 and engaging claw 91 are connected in a rotationally secure manner to each other in this case. The engaging claw 91 is opposite the catch detent 30 and the clamping claw 92 is opposite the clamping element 40 in this case.

The locking detent 80, the engaging claw 91 and the clamping claw 92 are therefore arranged in separate functional planes. A functional plane extends in this case perpendicularly to the axial direction and has, unlike a mathematical plane, an extent in an axial direction. The catch detent 30 is located in the functional plane of the engaging claw 91. The clamping element 40 is located in the functional plane of the clamping claw 92.

The locking detent 80 has a projection 28 having a retention contour 27. In the locked state of the locking unit 10, the retention contour 27 abuts the locking bolt 12.

The engaging claw 91 has a first support contour 22, a first closure contour 25 and a contour 26 for retaining in the open state. In the locked state of the locking unit 10, the engaging face 31 of the catch detent 30 is spaced slightly apart from the first support contour 22 of the engaging claw 91.

In the unlocked state of the locking unit 10, the contour 26 for retaining in the open state of the engaging claw 91 abuts the catch detent 30. During the locking and unlocking of the locking unit 10, the first closure contour 25 of the engaging claw 91 is in contact with the locking bolt 12.

The clamping claw 92 has a second support contour 22 and a second closure contour 25. In the locked state of the locking unit 10, the second support contour 22 of the clamping claw 92 abuts the clamping face 41 of the clamping element 40.

During the locking and unlocking of the locking unit 10, the second closure contour 25 of the clamping claw 92 is in contact with the locking bolt 12.

In this instance, there is fitted to the covering plate 18 a stop element 60, which the locking bolt 12 abuts in the locked state of the locking unit 10. In the locked state of the locking unit 10, therefore, the locking bolt 12 is clamped between the retention contour 27 of the locking detent 80 and the stop element 60.

The stop element 60 is arranged in this instance in the functional plane of the locking detent 80. In the locked state of the locking unit 10, the contact locations of the locking bolt 12 are located with the retention contour 27 of the locking detent 80 and with the stop element 60 substantially in a plane which extends perpendicularly to the axial direction.

During the locking and unlocking of the locking unit 10, the clamping claw 92 and the engaging claw 91 pivot past the stop element 60.

Figure 7:
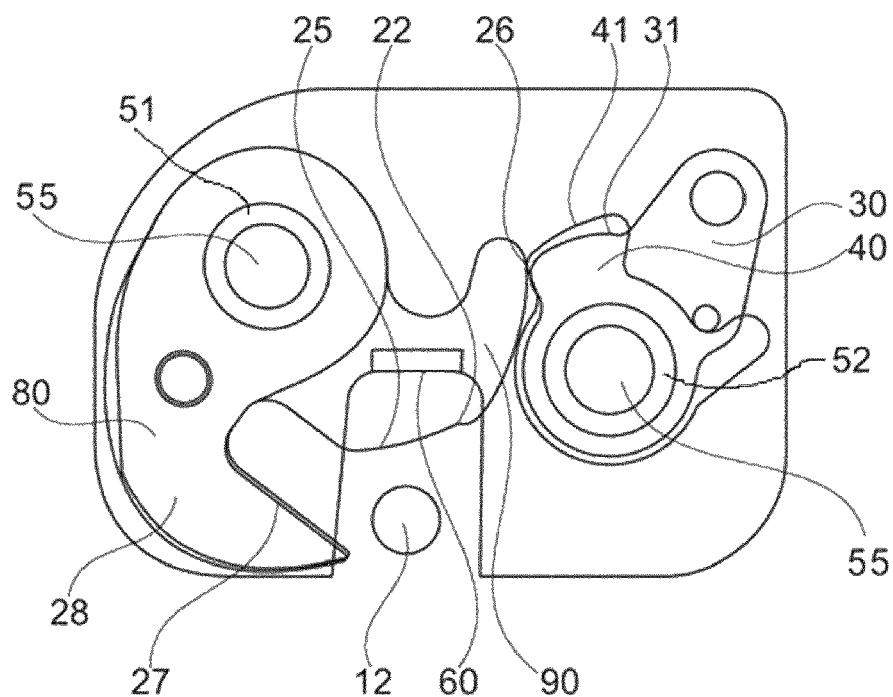
FIG. 7 is a schematic side view of a third embodiment of a locking unit according to the invention in the unlocked state.
Figure 8:
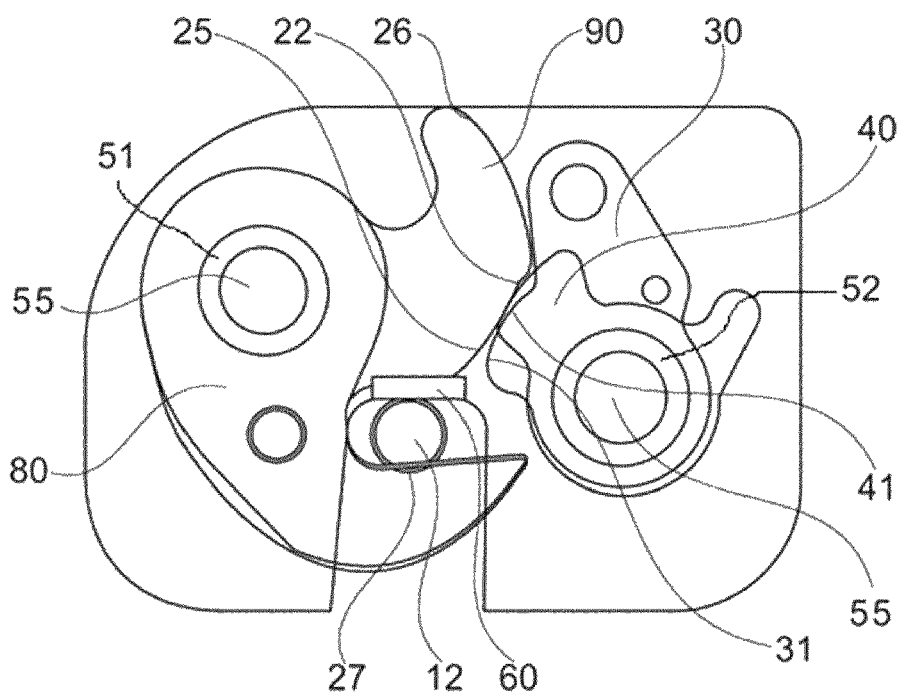
FIG. 8 is a schematic side view of the third embodiment according to FIG. 7 in the locked state.
Figure 9:
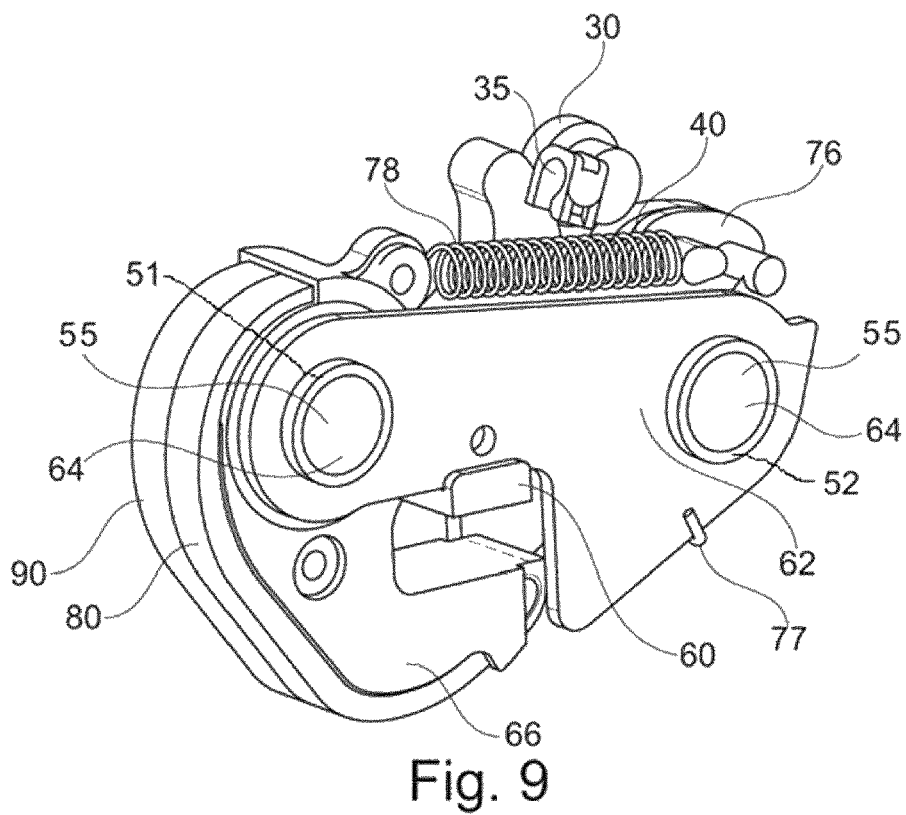
FIG. 9 is a perspective view of a fourth embodiment of a locking unit according to the invention in the locked state.
Figure 10:
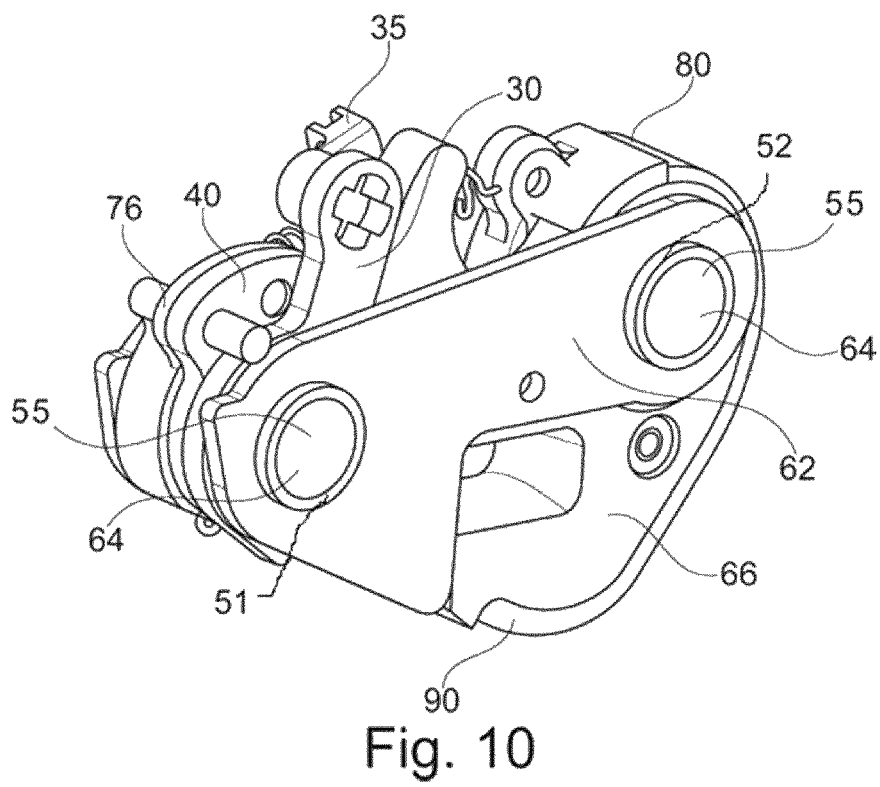
FIG. 10 is another perspective view of the fourth embodiment according to FIG. 9 in the locked state.
Figure 11:
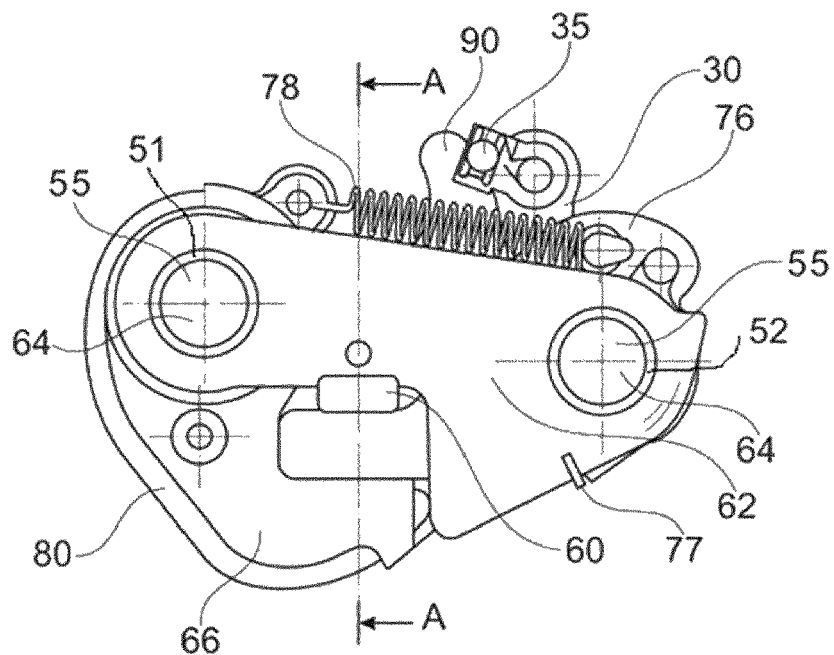
FIG. 11 is a side view of the fourth embodiment according to FIG. 9 in the locked state.
Figure 12:
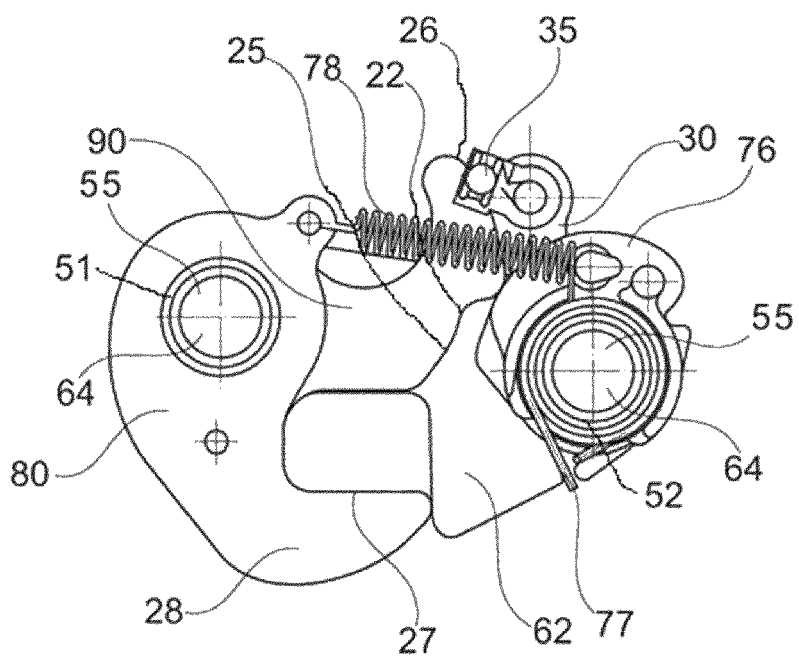
FIG. 12 is a side view of the fourth embodiment according to FIG. 9 in the locked state without a front connection plate and without a covering.

FIG. 7 and FIG. 8 illustrate a third embodiment of a locking unit 10 according to the invention. The differences between the third embodiment and the locking unit known from the prior art will substantially be discussed below.

Instead of a rotary latch, the locking unit 10 according to the third embodiment has a locking detent 80 and a claw 90 which are pivotably supported on the first bearing pin 51 so as to be offset parallel in an axial direction. The locking detent 80 and the claw 90 are connected in a rotationally secure manner to each other in this case. The claw 90 is opposite the catch detent 30 and the clamping element 40 in this case.

The locking detent 80 and the claw 90 are therefore arranged in separate functional planes. A functional plane extends in this case perpendicularly to the axial direction and has, unlike a mathematical plane, an extent in an axial direction. The catch detent 30 and the clamping element 40 are located in the functional plane of the claw 90.

The locking detent 80 has a first projection 28 having a first retention contour 27. In the locked state of the locking unit 10, the first retention contour 27 of the locking detent 80 abuts the locking bolt 12.

The claw 90 has a support contour 22, a closure contour 25, a contour 26 for retaining in the open state and a second projection 28 having a second retention contour 27.

In the locked state of the locking unit 10, the support contour 22 of the claw 90 abuts the clamping face 41 of the clamping element 40 and the engaging face 31 of the catch detent 30 is slightly spaced apart from the support contour 22 of the claw 90.

In the locked state of the locking unit 10, the second retention contour 27 of the claw 90 further abuts the locking bolt 12.

In the unlocked state of the locking unit 10, the contour 26 for retaining in the open state of the claw 90 abuts the catch detent 30. During the locking and unlocking of the locking unit 10, the closure contour 25 of the claw 90 is in contact with the locking bolt 12.

In this instance, there is fitted to the covering plate 18 a stop element 60, which the locking bolt 12 abuts in the locked state of the locking unit 10. In the locked state of the locking unit 10, therefore, the locking bolt 12 is clamped between the first retention contour 27 of the locking detent 80 and the stop element 60.

The stop element 60 is arranged in this instance in the functional plane of the locking detent 80. In the locked state of the locking unit 10, the contact locations of the locking bolt 12 are located with the first retention contour 27 of the locking detent 80 and with the stop element 60 substantially in a plane which extends perpendicularly to the axial direction.

During the locking and unlocking of the locking unit 10, the claw 90 pivots past the stop element 60.

FIG. 9 to FIG. 14 illustrate a fourth embodiment of a locking unit 10 according to the invention. The fourth embodiment is substantially equivalent to the third embodiment in this case. Therefore, the differences between the fourth embodiment and the third embodiment will substantially be discussed below.

The locking unit 10 according to the fourth embodiment comprises two connection plates 62 which comprise metal in this case and which are constructed to be planar. The two connection plates 62 extend parallel with each other and have two retention holes 64 for receiving two bearing pins 51, 52.

A locking detent 80 and a claw 90 are surrounded by a common covering 66 which comprises plastics material in this case. The covering 66 covers inter alia the retention contours 27 of the projections 28 of the locking detent 80 and the claw 90. In the region in which the covering 66 covers the retention contours 27, the covering 66 is constructed to be curved in a slightly convex manner.

Figure 13:
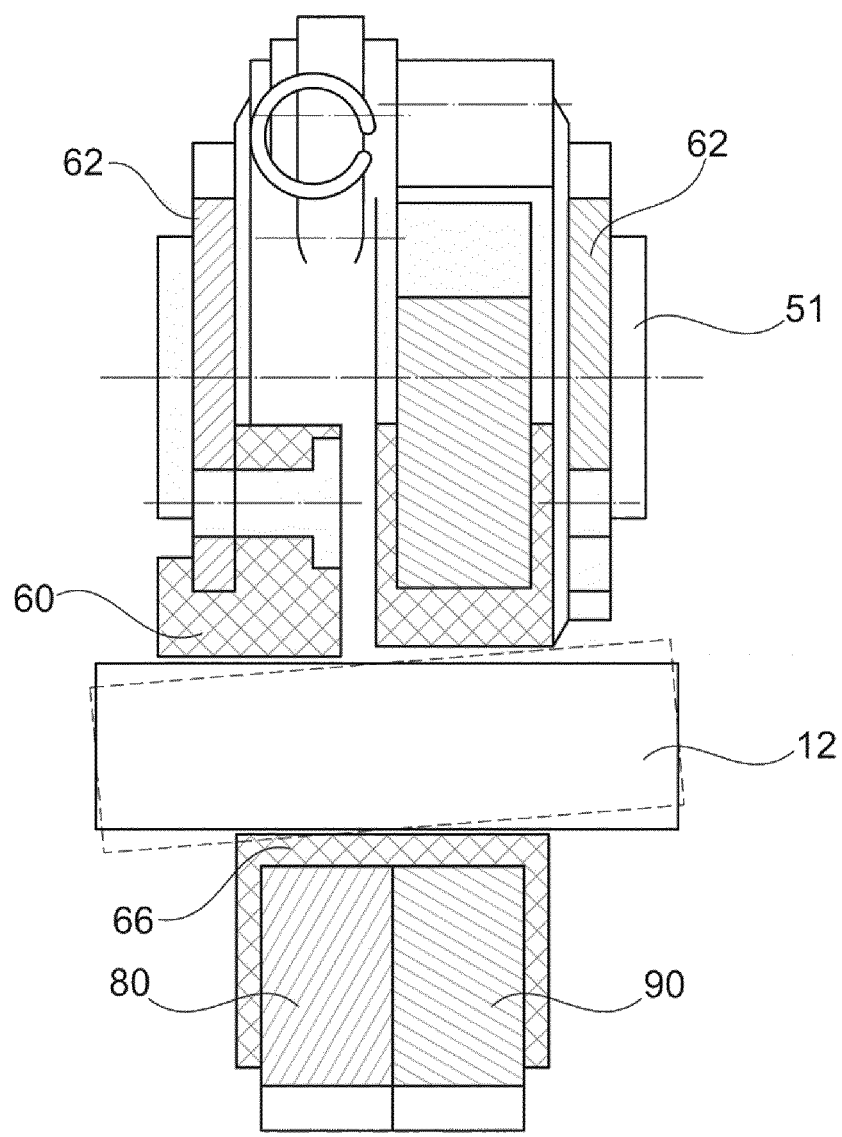
FIG. 13 is a section along the line A-A in FIG. 11.
Figure 14:
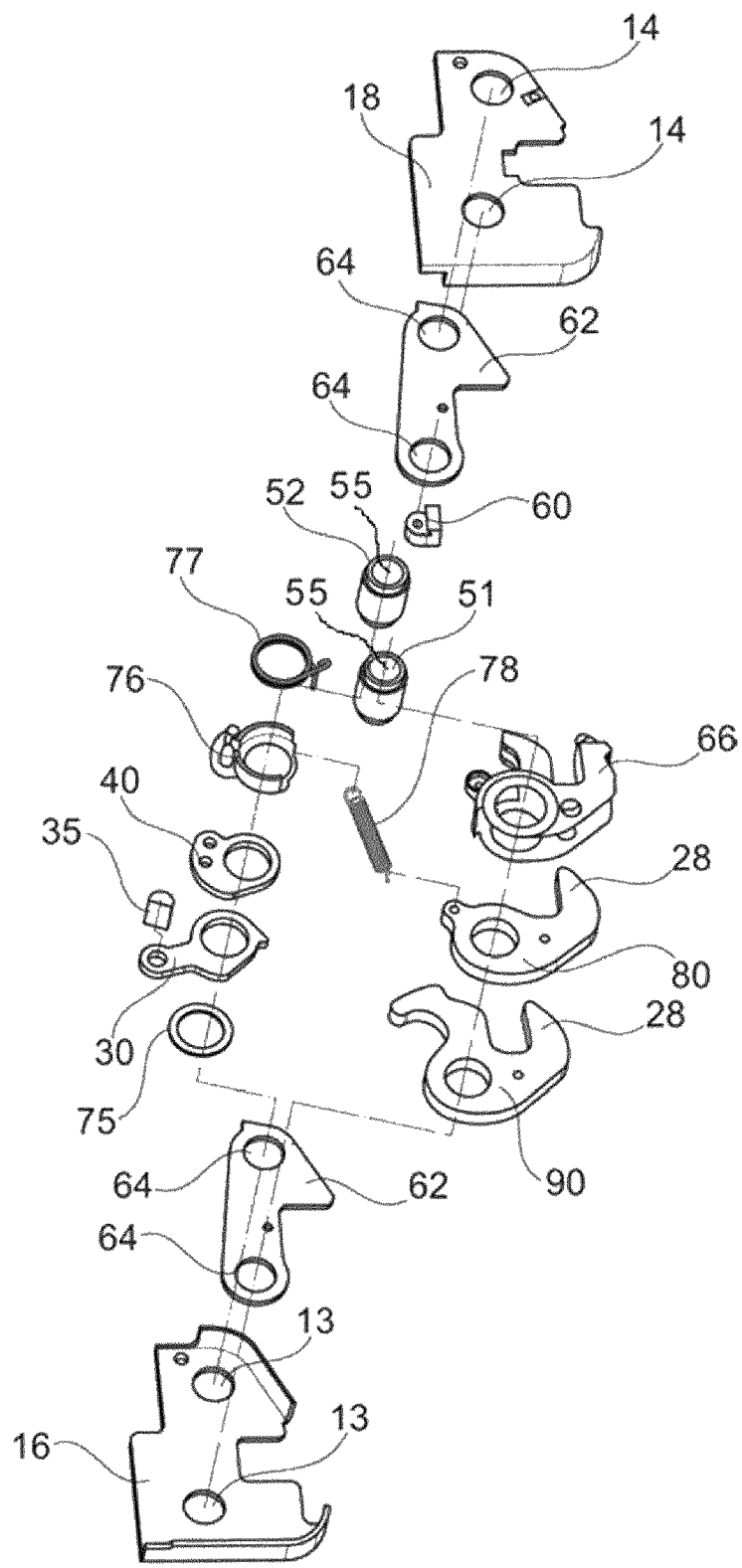
FIG. 14 is an exploded view of the fourth embodiment according to FIG. 9.

The covering 66 is curved in such a manner that, in the locked state of the locking unit 10, the contact locations of the locking bolt 12 with respect to the covering 66 of the retention contours 27 and with respect to the stop element 60 are substantially in a plane which extends perpendicularly to the axial direction. In the case of a slight inclination of the locking bolt 12 to the axial direction which is indicated in FIG. 13 by an interrupted border, the contact location of the locking bolt 12 with respect to the covering 66 of the retention contours 27 is also displaced in an axial direction only to an insignificant extent.

The first bearing pin 51, on which the locking detent 80 and the claw 90 are pivotably arranged, is inserted at both sides in a retention hole 64 of a connection plate 62 and secured at that location.

A spacer disc 75, a catch detent 30, a clamping element 40 and a carrier 76 are pivotably supported beside each other on the second bearing pin 52.

The second bearing pin 52 is also inserted at both sides in a retention hole 64 of a connection plate 62 and secured at that location.

The catch detent 30 is pretensioned in the direction towards the rotary latch 20 by means of a leg spring 77. The leg spring 77 is wound around the second bearing pin 52 and is supported with a spring end on one of the connection plates 62 and on the catch detent 30.

The clamping element 40 is connected to the carrier 76 in a rotationally secure manner. A tension spring 78 is fixed to the locking detent 80 and the carrier 76. The locking detent 80 is pretensioned in an opening direction and the clamping element 40 is pretensioned in the direction toward the rotary latch 20 by means of the tension spring 78.

There is provided, in this instance clip-fitted, on the catch detent 30 an engaging sleeve 35 which comprises plastics material in this case and which serves to fix an actuation rod which is not illustrated in this case.

The stop element 60 is fixed to the connection plate 62 which is adjacent to the locking detent 80. Optionally, a side plate 16 and a covering plate 18 form a lock housing for the locking unit 10.

Figure 15:
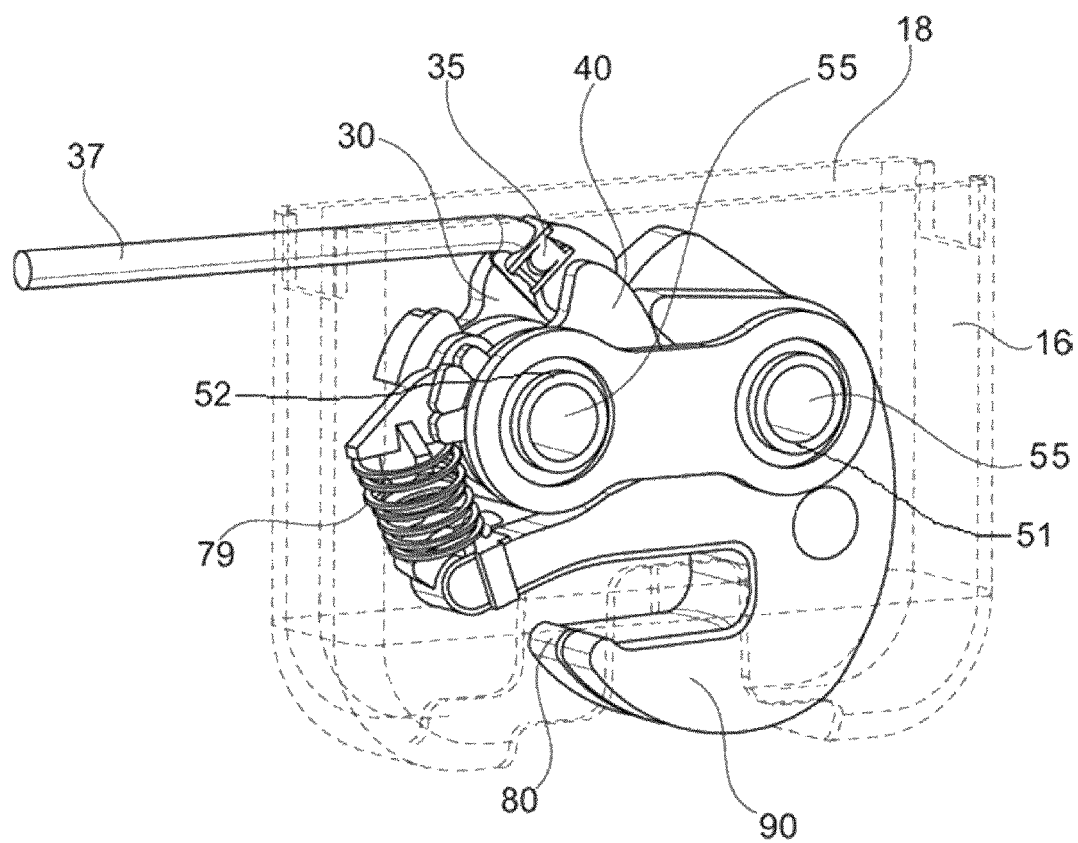
FIG. 15 is a perspective view of a fifth embodiment of a locking unit according to the invention in the locked state.

FIG. 15 illustrates a fifth embodiment of a locking unit 10 according to the invention. The fifth embodiment is substantially equivalent to the fourth embodiment in this instance.

Instead of a tension spring, there is provided a compression spring 79 which is fixed between the claw 90 and the clamping element 40. The locking detent 80 is pretensioned in the opening direction and the clamping element 40 is pretensioned in the direction toward the rotary latch 20 by means of the compression spring 79.

An actuation rod 37 is fixed to the engaging sleeve 35 provided on the catch detent 30.

Figure 16:
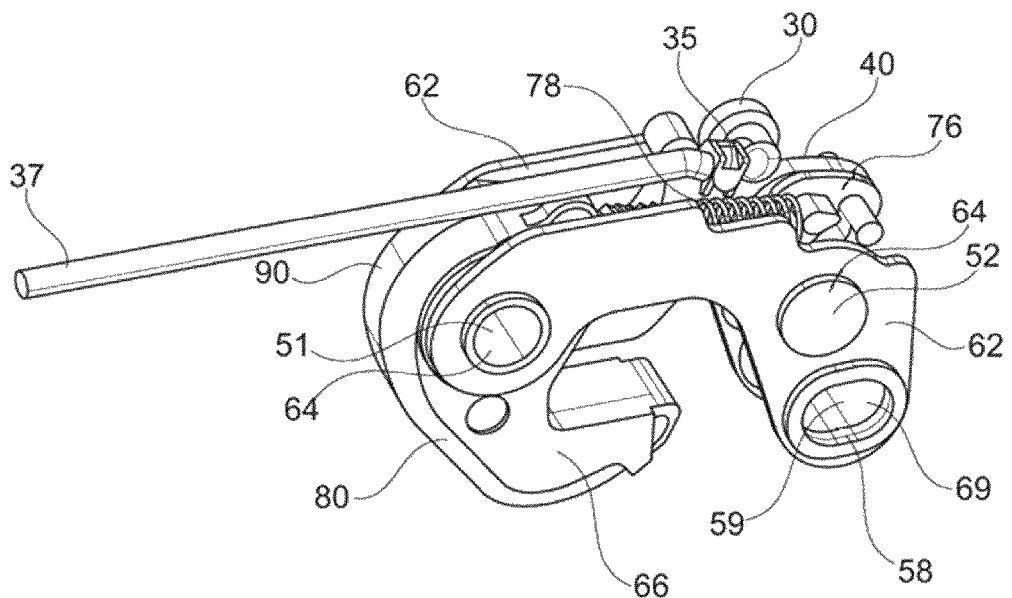
FIG. 16 is a perspective view of a sixth embodiment of a locking unit according to the invention in the locked state.
Figure 17:
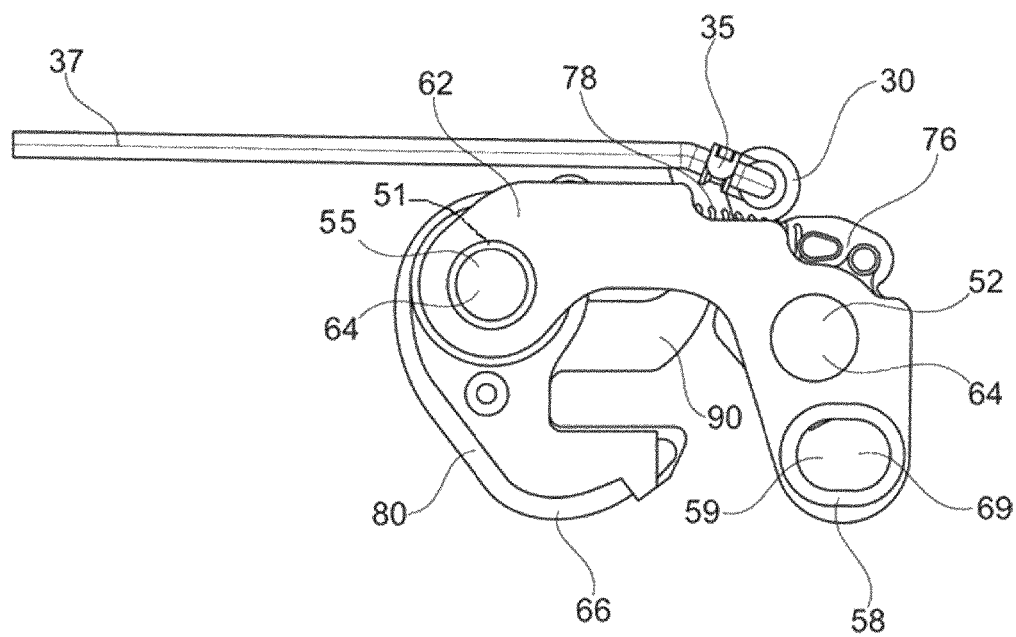
FIG. 17 is a side view of the sixth embodiment according to FIG. 16 in the locked state.

FIG. 16 and FIG. 17 illustrate a sixth embodiment of a locking unit 10 according to the invention. The sixth embodiment is substantially equivalent to the fourth embodiment in this instance.

A retention opening 69 is provided in the two connection plates 62 in addition to the two retention holes 64. The retention openings 69 are each constructed as a slot. A retention bolt 58 is inserted into the two retention openings 69. The retention bolt 58 is constructed to be hollow-cylindrical and has a gripping opening 59.

In this instance, the retention bolt 58 has a cross-section which is different from the circular shape and which is adapted to the slot-like form of the retention openings 69. The gripping opening 59 also has an elongate cross-section which is different from the circular shape.

In this instance, the second bearing pin 52 is constructed to be solid and therefore does not have any through-opening.

In order to fix the locking unit 10, there are provided two screws which are inserted in the through-opening 55 of the first bearing pin 51 and in the gripping opening 59 of the retention bolt 58. The screws are screwed into fixing holes in the structural component.

As a result of the slot-like cross-section of the gripping opening 59 of the retention bolt 58, the spacing of the two screws with respect to each other is variable. It is thereby possible to adapt the locking unit 10 to different gauges of the structural component.

The spacing of the center axes of the fixing holes with respect to each other is referred to in this case as the gauge.

Alternatively, the retention bolt 58 is constructed similarly to the first bearing pin 51 and has a circular cross-section and a gripping opening 59 with a circular cross-section. In order to adapt the locking unit 10 to different gauges, the retention bolt 58 can be displaced within the slot-like retention openings 69. The spacing of the two screws which are inserted in the through-opening 55 of the first bearing pin 51 and in the gripping opening 59 of the retention bolt 58 is also thereby variable.

An actuation rod 37 is fixed to the engaging sleeve 35 which is provided on the catch detent 30.

The features disclosed in the above description, the claims and the drawings may be significant both individually and together for implementing the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A locking unit for a vehicle seat, the locking unit comprising:
   a locking detent which is pivotably supported about a pivot axis between an open position and a closed position and which has a retention contour in order to retain a locking bolt in the closed position;
   at least one claw pivotably supported about the same pivot axis so as to be offset in the axial direction relative to the locking detent, wherein the claw has a closure contour, wherein the locking detent can be pivoted from the open position into the closed position by the closure contour being acted upon by the locking bolt, wherein the claw has a support contour which cooperates in the closed position of the locking detent with a catch detent in order to secure the locking detent and/or with a clamping element in order to discharge play of the locking detent, the claw having an outermost edge surface defining the support contour, wherein the support contour directly contacts the catch detent and/or the clamping element; and
   a stop element arranged in such a manner that, when the locking unit is locked, the locking bolt abuts the stop element in a first contact location and the retention contour in a second contact location, wherein the first contact location and the second contact location are located at least approximately in a plane which extends perpendicularly to the axial direction.

2. The locking unit as claimed in claim 1, wherein the stop element is arranged to be offset relative to the claw in an axial direction.

3. The locking unit as claimed in claim 1, wherein the clamping element is pivotably supported about a second pivot axis which extends parallel with the pivot axis of the locking detent.

4. The locking unit as claimed in claim 1, wherein the clamping element is constructed as a wedge which is guided in translation movement.

5. The locking unit as claimed in claim 1, wherein the claw has a contour for retaining in the open state which cooperates with the catch detent in order to secure the catch detent in the open position of the locking detent.

6. The locking unit as claimed in claim 1, wherein the locking detent and the claw are connected to each other in a rotationally secure manner.

7. The locking unit as claimed in claim 1, further comprising a bearing pin and two connection plates which extend parallel with each other and which have two retention holes in which the bearing pin is inserted, respectively, and a retention opening, in which a retention bolt having a gripping opening is inserted, wherein the retention opening is constructed as a slot or the gripping opening is constructed as a slot or both the retention opening and the gripping opening are constructed as a slot.

8. The locking unit as claimed in claim 1, wherein the locking detent and the claw are partially surrounded by a common covering.

9. The locking unit as claimed in claim 1, wherein the claw has a closure contour, a contour for retaining in the open state and a projection having a retention contour.

10. The locking unit as claimed in claim 9, wherein the covering covers at least the retention contour of the projection of the locking detent and the claw.

11. The locking unit as claimed in claim 10, wherein the covering has a convex curvature in a region of the retention contours.

12. A vehicle seat comprising at least one locking unit comprising:
- a locking detent which is pivotably supported about a pivot axis between an open position and a closed position and which has a retention contour in order to retain a locking bolt in the closed position;
- at least one claw pivotably supported about the same pivot axis so as to be offset in the axial direction relative to the locking detent, wherein the claw has a closure contour, wherein the locking detent can be pivoted from the open position into the closed position by the closure contour being acted upon by the locking bolt, wherein the claw has a support contour which cooperates in the closed position of the locking detent with a catch detent in order to secure the locking detent and/or with a clamping element in order to discharge play of the locking detent, the claw comprising an outermost claw surface, wherein only the outermost claw surface defines the support contour, the support contour engaging the locking detent/or the clamping element; and
- a stop element arranged in such a manner that, when the locking unit is locked, the locking bolt abuts the stop element in a first contact location and the retention contour in a second contact location, wherein the first contact location and the second contact location are located at least approximately in a plane which extends perpendicularly to the axial direction.

13. A vehicle seat as claimed in claim 12, wherein the stop element is arranged to be offset relative to the claw in an axial direction.

14. A vehicle seat as claimed in claim 12, wherein the clamping element is pivotably supported about a second pivot axis which extends parallel with the pivot axis of the locking detent.

15. A vehicle seat as claimed in claim 12, wherein the clamping element is constructed as a wedge which is guided in translation movement.

16. A vehicle seat as claimed in claim 12, wherein the claw has a contour for retaining in the open state which cooperates with the catch detent in order to secure the catch detent in the open position of the locking detent.

17. The locking unit as claimed in claim 1, wherein the claw has a surface defining the support contour, the surface being in direct contact with one or more of the catch detent and the clamping element in the closed position of the locking detent.

18. A vehicle seat as claimed in claim 12, wherein the claw has a surface defining the support contour, the surface being in direct contact with one or more of the catch detent and the clamping element in the closed position of the locking detent.

* * * * *